(12) United States Patent
Pidwerbesky et al.

(10) Patent No.: US 11,484,853 B2
(45) Date of Patent: Nov. 1, 2022

(54) DEFLECTOR OF AN AGRICULTURAL AGITATION SYSTEM

(71) Applicant: CNH Industrial Canada, Ltd., Saskatoon (CA)

(72) Inventors: Jesse Blair Pidwerbesky, Warman (CA); Graham Douglas Stuart, Warman (CA); Paul David Minto, Saskatoon (CA); Jared Steven Wright, Saskatoon (CA)

(73) Assignee: CNH Industrial Canada, Ltd., Saskatoon (CA)

(*) Notice: Subject to any disclaimer, the term of this patent is extended or adjusted under 35 U.S.C. 154(b) by 806 days.

(21) Appl. No.: 16/265,792

(22) Filed: Feb. 1, 2019

(65) Prior Publication Data

US 2020/0246769 A1 Aug. 6, 2020

(51) Int. Cl.
| | | |
|---|---|---|
| *B01F 15/02* | (2006.01) | |
| *A01C 15/00* | (2006.01) | |
| *B01F 7/00* | (2006.01) | |
| *B01F 15/00* | (2006.01) | |
| *B01F 35/00* | (2022.01) | |
| *B01F 27/192* | (2022.01) | |
| *B01F 35/22* | (2022.01) | |
| *B01F 35/32* | (2022.01) | |

(Continued)

(52) U.S. Cl.
CPC ............ *B01F 35/79* (2022.01); *A01C 15/005* (2013.01); *B01F 27/1921* (2022.01); *B01F 35/2202* (2022.01); *B01F 35/3204* (2022.01); *B01F 35/71731* (2022.01); *A01C 7/04* (2013.01); *B01F 35/3215* (2022.01); *B01F 2101/09* (2022.01); *B01F 2101/32* (2022.01)

(58) Field of Classification Search
CPC ... B01F 15/0298; A01C 15/007; A01C 15/16; A01C 7/16; E01C 2019/208; E01C 2019/209

See application file for complete search history.

(56) References Cited

U.S. PATENT DOCUMENTS

| 1,000,004 A | 8/1911 | Huber |
|---|---|---|
| 2,129,523 A | 9/1938 | Butler |

(Continued)

FOREIGN PATENT DOCUMENTS

| CN | 207284104 U | 5/2018 |
|---|---|---|
| WO | 2017117639 A1 | 7/2017 |

OTHER PUBLICATIONS

Frontier Equipment; "Frontier Spreaders" pp. 1-6. 2009.

(Continued)

*Primary Examiner* — Elizabeth Insler
(74) *Attorney, Agent, or Firm* — Rebecca Henkel; Rickard DeMille

(57) ABSTRACT

The present disclosure is directed to an agitating system having a sub-hopper configured to receive particulate material, an agitator disposed within the sub-hopper and configured to promote movement of the particulate material through the sub-hopper, and a deflector configured to block a portion of the particulate material from exerting a force onto the agitator as the particulate material flows through the sub-hopper. The deflector is positioned such that the agitator extends beyond a first distal edge and a second distal edge of the deflector along a lateral axis.

20 Claims, 4 Drawing Sheets

(51) Int. Cl.
  *B01F 35/71* (2022.01)
  *A01C 7/04* (2006.01)
  *B01F 101/09* (2022.01)
  *B01F 101/32* (2022.01)

(56) References Cited

U.S. PATENT DOCUMENTS

| | | | |
|---|---|---|---|
| 2,713,442 A * | 7/1955 | McFarling | A01C 7/16 |
| | | | 222/238 |
| 3,189,230 A | 6/1965 | Gillespie | |
| 3,369,762 A | 2/1968 | Buzenberg et al. | |
| 3,749,321 A | 7/1973 | Roiser | |
| 3,768,737 A * | 10/1973 | Tobias | A01C 17/003 |
| | | | 239/666 |
| 4,234,109 A * | 11/1980 | Goodhart | A01C 15/006 |
| | | | 222/609 |
| 4,357,111 A | 11/1982 | Honemeyer et al. | |
| 4,597,531 A | 7/1986 | Kise | |
| 5,161,473 A | 11/1992 | Landphair et al. | |
| 5,275,335 A | 1/1994 | Knight et al. | |
| 6,112,679 A | 9/2000 | Borstmayer et al. | |
| 6,123,448 A | 9/2000 | Becker et al. | |
| 6,220,532 B1 | 4/2001 | Manon et al. | |
| 6,935,256 B1 | 8/2005 | Meyer | |
| 6,966,506 B2 | 11/2005 | McLeod et al. | |
| 7,104,207 B2 | 9/2006 | Wake et al. | |
| 7,543,765 B1 * | 6/2009 | Eiling | E01C 19/201 |
| | | | 222/626 |
| 7,603,956 B2 | 10/2009 | Noh et al. | |
| 7,631,606 B2 | 12/2009 | Sauder et al. | |
| 7,938,072 B2 | 5/2011 | Wilhelm et al. | |
| 7,959,348 B2 | 6/2011 | Hogan | |
| 8,702,368 B2 | 4/2014 | Van Mill et al. | |
| 8,714,344 B2 | 5/2014 | Kowalchuk et al. | |
| 8,857,353 B2 | 10/2014 | Chuk | |
| 8,931,425 B2 | 1/2015 | Friggstad | |
| 9,155,243 B2 | 10/2015 | Heintzman | |
| 9,215,841 B2 | 12/2015 | Johnson et al. | |
| 9,562,333 B2 * | 2/2017 | Sandler | E01C 19/204 |
| 9,661,805 B1 | 5/2017 | Conrad et al. | |
| 9,681,602 B2 | 6/2017 | Montag et al. | |
| 9,832,923 B2 | 12/2017 | Thomas | |
| 9,903,746 B2 | 2/2018 | Rusch | |
| 9,908,720 B2 | 3/2018 | Roberge et al. | |
| 10,088,350 B2 | 10/2018 | Montag et al. | |
| 10,766,010 B2 | 9/2020 | Nesheim et al. | |
| 2007/0069044 A1 | 3/2007 | Sandler et al. | |
| 2016/0123353 A1 | 5/2016 | Millie | |
| 2019/0230847 A1 | 8/2019 | Forrest et al. | |
| 2019/0230848 A1 | 8/2019 | Forrest et al. | |
| 2020/0029495 A1 | 1/2020 | Kowalchuk | |
| 2020/0173125 A1 | 6/2020 | Grimes et al. | |
| 2020/0245538 A1 | 8/2020 | Turner et al. | |
| 2020/0245543 A1 | 8/2020 | Collins et al. | |

OTHER PUBLICATIONS

"Screw Conveyor Catalogue And Engineering Manual," 1986, 100 pages, Continental Conveyor, [http://www.continentalconveyor.ca/images/product_pdf/Screw_Conveyor_Catalogue.pdf].

* cited by examiner

DEFLECTOR OF AN AGRICULTURAL AGITATION SYSTEM

BACKGROUND

The disclosure relates generally to an agitating system for an agricultural system.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, agricultural seeding implements are towed behind a work vehicle, such as a tractor. These implements may contain a particulate material, such as seeds, fertilizer, and/or other agricultural product, which is distributed on or in the ground using various methods. Certain implementations include a storage tank in which the particulate material is stored and a metering system configured to meter the particulate material from the storage tank. The particulate material is distributed from the metering system to row units, which are configured to distribute the particulate material on or in the ground. As the amount of particulate material increases in the storage tank, the weight of the particulate material may exert a force onto parts of the agricultural seeding implement that may affect a performance of the agricultural seeding implement.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, an agitating system includes a sub-hopper configured to receive particulate material, an agitator disposed within the sub-hopper and configured to promote movement of the particulate material through the sub-hopper, and a deflector configured to block a portion of the particulate material from exerting a force onto the agitator as the particulate material flows through the sub-hopper. The deflector is positioned such that the agitator extends beyond a first distal edge and a second distal edge of the deflector along a lateral axis.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
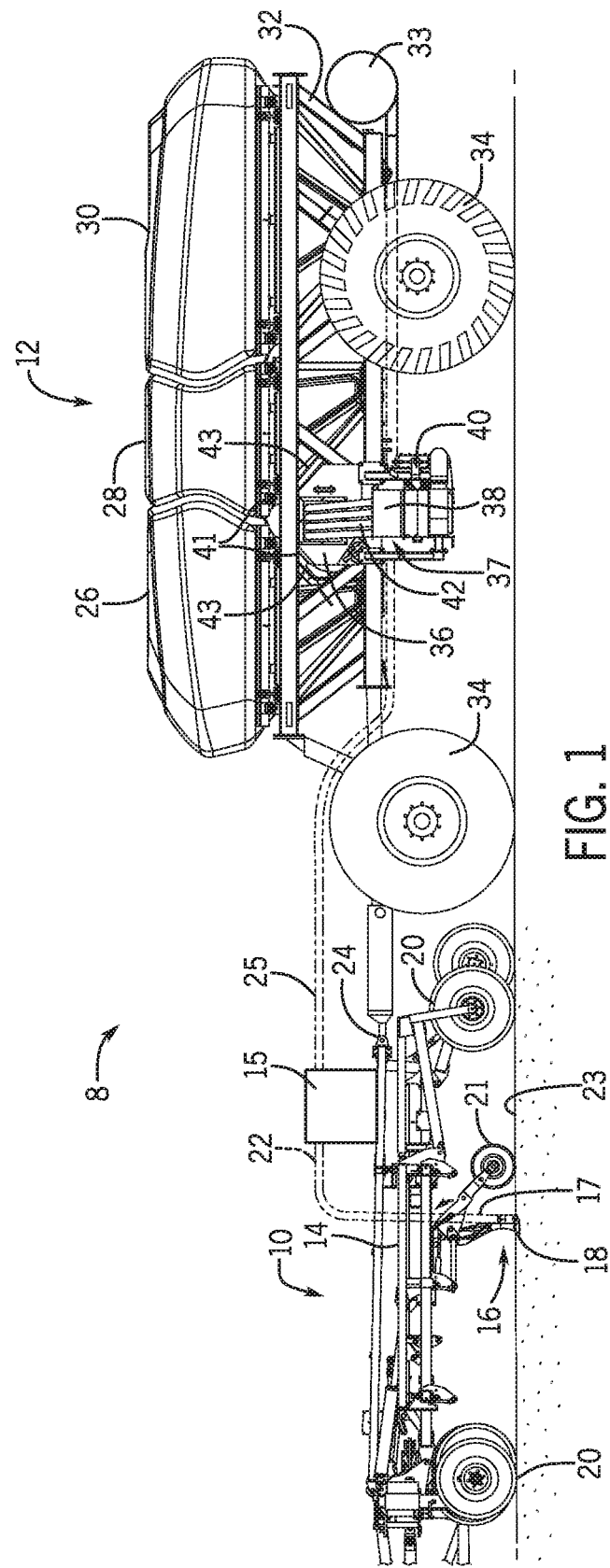
FIG. 1 is a side view of an embodiment of an agricultural system having an agricultural implement coupled to an air cart, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Embodiments of the present disclosure relate to an agricultural system having an agitating system. Certain agricultural systems (e.g., air carts, implements, etc.) contain a particulate material (e.g., seeds, fertilizer, and/or other agricultural products) within a storage tank of the agricultural system. The agricultural system is configured to distribute the particulate material throughout a field. The particulate material may flow from the storage tank into a metering system, which is configured to control the flow of the particulate material to the field. In certain embodiments, the agricultural system includes an agitating system, in which the agitating system is configured to promote movement of the particulate material into the metering system, such as by separating clumped portions of the particulate material.

As the storage tank is filled with the particulate material, the particulate material may exert a force (e.g., due to the weight of the particulate material) onto certain components of the agricultural system, such as onto portion(s) of the agitating system. The imparted force may affect performance of the agitating system. For example, the force may increase resistance to move certain component(s) of the agitating system. Thus, the force exerted by the particulate material onto the agitating system may reduce performance of the agitating system (e.g., reduce the ability of the agitating system to promote movement of the particulate material to the metering system). In certain embodiments, the force caused by the weight of the particulate material may be reduced by decreasing the particulate material within the storage tank. However, the decreased amount of particulate material in the storage tank may reduce efficiency and/or effectiveness of the agricultural system to distribute the particulate material throughout the field. For example, a reduced area of the field may receive the particulate material during an operation of the agricultural system.

Accordingly, in the embodiments disclosed herein, the agricultural system includes a deflector positioned to reduce an amount of force exerted by the particulate material onto portion(s) of the agitating system. For example, the deflector may be positioned adjacent to an agitator of the agitating system such that the deflector directs material around the agitator toward the metering system. In this manner, the deflector "shields" the agitator from particulate material that is flowing through the storage tank. Thus, the force exerted by the particulate material onto the agitator may be reduced, thereby enabling the agitator to break up clumps of the particulate material. For example, less energy may be used to operate the agitator to break up the clumps to conserve energy, or the agitator may break up clumps of the particulate material more effectively. As such, a performance of the agricultural system may be improved, such as the ability of the agitating system to promote movement of the particulate material.

With the foregoing in mind, the present embodiments relating to agitating systems may be utilized within any suitable agricultural system. To help illustrate, FIG. 1 is a side view of an embodiment of an agricultural system 8 having an agricultural implement 10 coupled to an air cart 12. As depicted, the agricultural implement 10 includes a tool frame 14 coupled to a header 15, a row unit 16 having a particulate material tube 17 and an opener 18, and wheel assemblies 20. The agricultural implement 10 may be pulled by a work vehicle (e.g., a tractor) to deposit rows of particulate material (e.g., agricultural product) within the soil. Accordingly, the wheel assemblies 20 may contact the soil surface to enable the agricultural implement 10 to be pulled by the work vehicle. As the agricultural implement 10 is pulled, a row of the particulate material may be deposited in the soil by the row unit 16 (e.g., ground engaging opener assembly). Although only one row unit 16 is shown, the agricultural implement 10 may include multiple row units 16 (e.g., organized in a row across the agricultural implement 10). In some embodiments, the agricultural implement 10 may include a row of 12, 14, 16, 18, 20, or more row units 16, which may each deposit a respective row of particulate material into the soil.

To facilitate depositing the particulate material, each row unit 16 (e.g., ground engaging opener assembly) may include a press wheel 21. While the opener 18 engages the soil 23, the opener 18 exerts a force that excavates a trench into the soil 23 as the row unit 16 travels across the soil 23. The particulate material may be deposited into the excavated trench via the particulate material tube 17. Then, the press wheel 21 may pack soil onto the deposited particulate material. In certain embodiments, the press wheel may not directly be a part of the row unit. Instead, for example, at least one press wheel may be mounted to the frame of the implement behind the at least one row unit. Furthermore, while the illustrated row unit includes a ground engaging opener assembly, in alternative embodiments, at least one row unit on the implement may include an applicator assembly configured to deposit particulate material onto the surface of the field, or any other suitable type of product deposition assembly.

The header 15 may provide the particulate material to the row units 16. In some embodiments, the header 15 may pneumatically distribute the particulate material from a primary line to secondary lines. In the illustrated embodiment, a primary line 25 directs particulate material from the air cart 12 to the header 15. Additionally, the header 15 is configured to distribute the particulate material to the row units 16 via respective secondary lines 22. In certain embodiments, multiple primary lines may direct particulate material to multiple headers. Moreover, multiple secondary lines may extend from each header to respective row units. Furthermore, in certain embodiments, at least one secondary line may extend to a secondary header, and multiple tertiary lines may extend from the secondary header to respective row units.

In the depicted embodiment, the air cart 12 is towed behind the agricultural implement 10. For example, the agricultural implement 10 may be coupled to the work vehicle by a first hitch assembly, and the air cart 12 may be coupled to the agricultural implement 10 by a second hitch assembly 24. However, in other embodiments, the agricultural implement may be towed behind the air cart. In further embodiments, the agricultural implement and the air cart may be part of a single unit that is towed behind the work vehicle, or may be elements of a self-propelled vehicle.

The air cart 12 may centrally store particulate material and distribute the particulate material to the header 15. Accordingly, as depicted, the air cart 12 includes three primary storage tanks 26, 28, and 30, an air cart frame 32, an air source 33, and wheels 34. Further, the air cart 12 includes an auxiliary or secondary storage tank 36, a fill hopper 38, an air supply 40, and product conveyance conduits 42. The second hitch assembly 24 is coupled between the tool frame 14 and the air cart frame 32, which enables the air cart 12 to be towed with the agricultural implement 10. Further, the fill hopper 38 enables an operator to fill the secondary storage tank 36. Accordingly, the fill hopper 38 is located on a side of the air cart 12 and at a level above the soil 23 that facilitates access by the operator (e.g., from ground level or from a bed of a truck). For example, an opening of the fill hopper 38, which receives the particulate material, may be located less than 5 feet (1.5 meters) above the ground. At this height, the operator may load the fill hopper 38 from ground level or from a truck bed, for example.

Additionally, the agricultural system 8 may include an agitating system 37 to agitate the particulate material within a storage tank. For purposes of discussion, this disclosure primarily refers to the agitating system 37 as being located in the secondary storage tank 36 to agitate the particulate material in the secondary storage tank 36. However, an agitating system may be located in one of the primary storage tanks 26, 28, 30 (e.g., in addition to or instead of the particulate material agitation control system in the secondary storage tank) to agitate the particulate material in the primary storage tank(s).

The primary storage tanks 26, 28, and 30, and the secondary storage tank 36 may store the particulate material (e.g., seeds, granular fertilizer, granular inoculants, etc.). In some embodiments, the primary storage tanks 26, 28, and 30 may each include a single large storage compartment for storing a single agricultural product. In certain embodiments, the primary storage tanks may each store a different agricultural product. For example, the first primary storage tank 26 may store legume seeds, and the second primary storage tank 28 may store a dry fertilizer. Additionally, in this example, the secondary storage tank 36 may store granular inoculants, which are planted in conjunction with the legume seeds. In such configurations, the air cart 12 may deliver seed, fertilizer, and inoculant to the agricultural implement 10 via separate primary lines, or as a mixture through a single primary line.

Further, as illustrated, the secondary storage tank 36 is positioned beneath portions of the primary storage tanks 26 and 28. To improve storage capacity of the secondary storage tank 36, upper walls 41 of the secondary storage tank 36 have slopes that substantially correspond to respective slopes of bottom portions 43 of the primary storage tanks 26 and 28. Therefore, the shape of the secondary storage tank 36 enables the secondary storage tank 36 to utilize a substantial portion of the space between the primary storage tanks 26 and 28. Similarly, in an alternative embodiment, the secondary storage tank may be positioned between the primary storage tanks 28 and 30.

The particulate material may be fed from the secondary storage tank 36 into the agitating system 37 into a metering system, which meters the particulate material, fluidizes the particulate material via a fluidizing airflow from the air source 33, and distributes the particulate material to the header 15 via the primary line 25. In some embodiments, the air source 33 may be one or more pumps and/or blowers powered by electric or hydraulic motor(s), for example. The agitating system 37 may be positioned at the bottom of the secondary storage tank 36 and above the metering system 45, and may be configured to facilitate movement of the particulate material into the metering system 45 from the secondary storage tank 36. For example, the agitating system 37 may break up clumped sections of particulate material to enable the particulate material to flow to the metering system 45.

Figure 2:
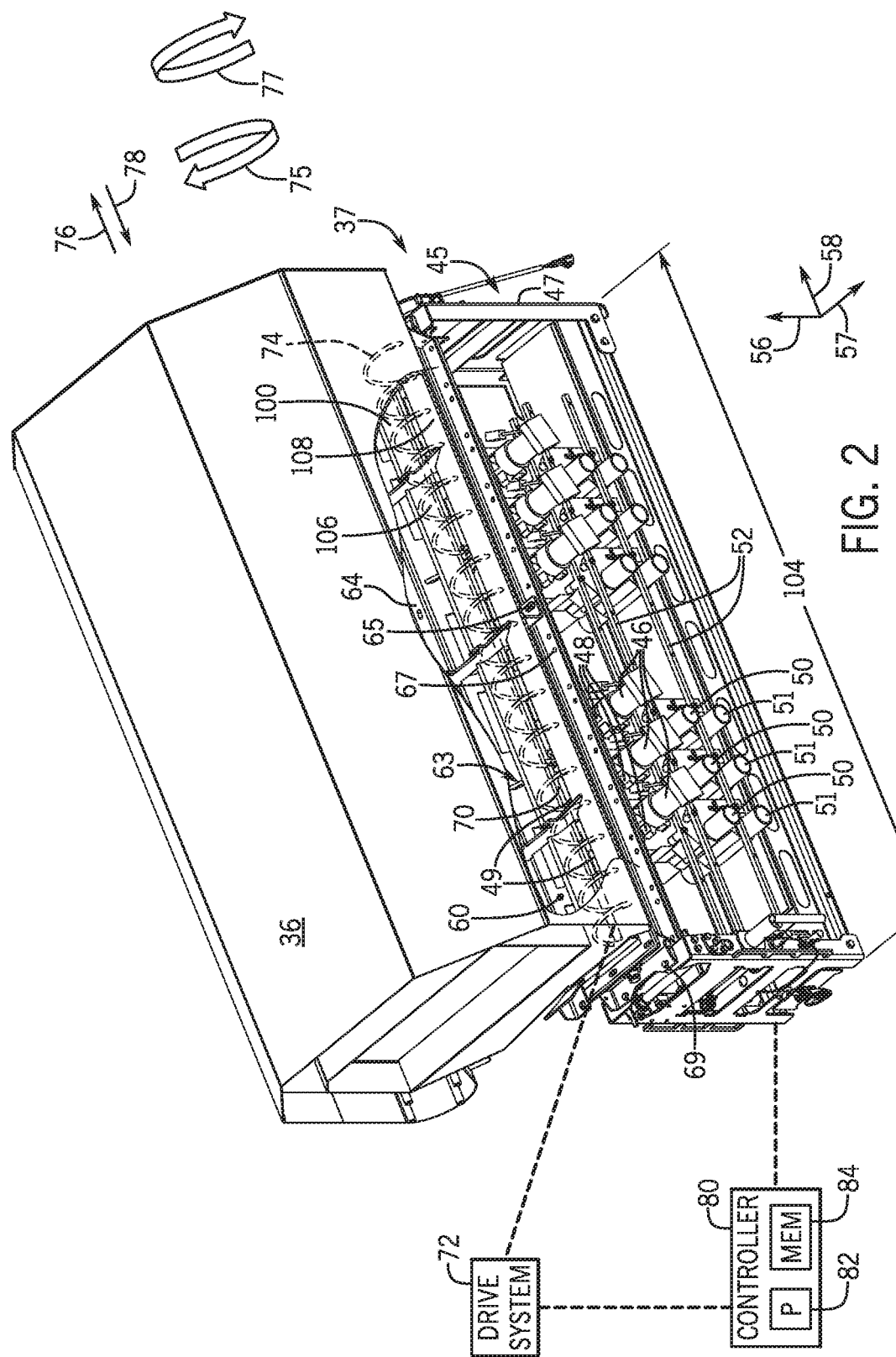
FIG. 2 is a perspective cutaway view of an embodiment of an agitating system that may be implemented in the air cart of FIG. 1, in which the agitating system has a deflector, in accordance with an aspect of the present disclosure.

FIG. 2 is a perspective cutaway view of an embodiment of an agitating system 37 that may be employed within the air cart 12 of FIG. 1. As illustrated, the secondary storage tank 36 is positioned above an agitator 63 of the agitating system 37, and the agitator 63 is positioned above a metering system 45. The agitating system 37 is configured to promote movement of particulate material from the secondary storage tank 36 to the metering system 45. Although to the agitator of the agitating system 37 is positioned below the secondary storage tank 36 in the illustrated embodiment, in certain embodiments, an agitating system may include an agitator positioned below one of the primary storage tanks, and thus, the agitating system may promote movement of particulate material from the primary storage tank to a respective metering system.

As illustrated, the metering system 45 includes multiple seed meters 46 supported by a frame 47. The metering system 45 may include 1 to 10, or more than 10 (e.g., 15), seed meters 46. In the illustrated embodiment, each seed meter 46 includes at least one respective metering device 48 (e.g., meter roller) to control flow of the particulate material to a respective primary conduit. Each seed meter 46 also includes an inlet 49 configured to receive the particulate material from the agitating system 37 (e.g., along a vertical axis 56). Furthermore, each seed meter 46 includes a first conduit connector 50 and a second conduit connector 51. Each conduit connector 50, 51 is configured to receive air flow from the air source and the particulate material from the metering device 48, thereby producing the air/material mixture. First primary conduits may be coupled to the first conduit connectors 50, and second primary conduits may be coupled to the second conduit connectors 51. Furthermore, the metering system 45 may include a gate 52 that enables selection of the first conduit connector 50 or the second conduit connector 51. Once the first conduit connector 50 or the second conduit connector 51 is selected, particulate material flows through the selected conduit connector 50, 51. The primary conduits may be coupled to respective headers that provide particulate material to multiple row units.

The agitating system 37 also includes a sub-hopper 64, which may be considered a part of the secondary storage tank. The sub-hopper 64 is secured to the metering system 45 (e.g., the frame 47 of the metering system 45) by fasteners 65 disposed through holes 67, 69 of the sub-hopper 64. The first holes 67 are generally aligned along a length of the sub-hopper 64 along a longitudinal axis 58, and the second holes 69 are arranged along a width of the sub-hopper 64 along a lateral axis 57. The sub-hopper 64 also includes third holes 68 configured to receive fasteners for securing the sub-hopper 64 to a structure of the secondary storage tank or another portion of the agricultural system (e.g., the air cart 12). Additionally or alternatively, the sub-hopper may be coupled to the frame and the secondary storage tank by other suitable devices, such as welds, tabs, and the like.

In the illustrated embodiment, the agitating system 37 includes one or more sensor(s) 60. Certain embodiments of the agitating system 37 may include 2, 3, 4, 6, 8, 10, 12, 14, or more sensors. The sensor(s) 60 are configured to detect a presence of particulate material at the location or position of the respective sensor(s) 60. As such, the sensor(s) 60 may determine a profile of particulate material disposed in the agitating system 37 and/or the secondary storage tank 36 before, during, and/or after operation of the agricultural system 8. A variety of sensor(s), such as ultrasonic sensor(s), electrostatic sensor(s), inductive sensor(s), capacitor sensor (s), Light Detection and Ranging (LIDAR) sensor(s), and/or other suitable sensor(s) may be used alone or in combination with one another to determine the profile of the particulate material. The sensor(s) may also include one or more camera(s) disposed in the sub-hopper 64 and/or secondary storage tank 36, in which the camera(s) may be configured to detect the profile. Additionally, in alternative embodiments, the sensor(s) may be disposed higher in the agitating system or above the agitating system (e.g., along the vertical axis 56). As illustrated in FIG. 2, the sensor(s) 60 are positioned adjacent to the agitator 63. However, the sensor (s) may be disposed in other suitable configurations/arrangements in the sub-hopper and/or secondary storage tank. In certain embodiments, the agitating system may not include any sensors, and thus, may not determine the profile of the particulate material.

Generally, the particulate material may flow downwardly through the secondary storage tank 36 to the metering system 45 via the agitating system 37. That is, the particulate material may flow through the sub-hopper 64 into the inlets 49 of the seed meters 46. In some embodiments, the particulate material may pass through other features of the agricultural system (e.g., of the air cart 12) before entering the metering system 45.

The agitator 63 of the agitating system 37 is disposed within the sub-hopper 64 and extends along the longitudinal axis 58 in an area below the sensors 60 along the vertical axis 56. In certain embodiments, the agitating system may be mounted higher in the secondary storage tank relative to the sub-hopper. For example, the agitating system may be disposed above the sub-hopper, such as within the structure of the secondary storage tank. As the particulate material rests in the secondary storage tank, the particulate material may clump together to form pieces that are larger than desired (e.g., larger than the openings of the inlets 49). When the particulate material flows through the agitating system 37 (e.g., while the agitating system 37 is operating), the clumps of particulate material break into smaller pieces more suitable for flowing through the metering system 45.

The agitator 63 includes a shaft 70 coupled to a drive system 72, and the agitator 63 includes an agitator coil 74 coupled to the shaft 70. In the illustrated embodiment, the agitator coil 74 is wrapped around the shaft 70 and is configured to enable the particulate material to flow between the shaft 70 and the agitator coil 74. Although this disclosure primarily discusses the agitator coil 74 as wrapped in a helical form, in additional or alternative embodiments, the agitator coil may be wrapped in a cylindrical form, a conical form, another suitable form, or any combination thereof, around the shaft. Additionally or alternatively, the agitator may include fingers or protrusions that extend from the shaft, in which movement of the fingers or protrusions induce movement of the particulate material. The agitator may include a certain configuration of fingers or protrusions, such as a concentration (e.g., a number per unit length) of fingers or protrusions, a length of each finger or protrusion, a shape of each finger or protrusion, a position of the fingers or protrusions, and so forth, that may vary along the length of the shaft. Furthermore, there may be more than one agitator coil coupled to the shaft at different locations along the length of the shaft. In the illustrated embodiment, the agitator 63 may rotate to move particulate material in the sub-hopper 64 and/or the secondary storage tank. The agitator 63 may be configured to rotate in either direction to move the particulate material toward each longitudinal side of the sub-hopper 64. For example, the drive system 72 may rotate the shaft 70 in a first rotational direction 75 to move the particulate material along a first longitudinal direction 76. The drive system 72 may also rotate the shaft in a second rotational direction 77 to move the particulate material along a second longitudinal direction 78. Such movement of the particulate material may promote movement of the particulate material through the sub-hopper 64 and/or the secondary storage tank 36, and/or may establish a desirable profile of the particulate material in the sub-hopper 64 and/or the secondary storage tank 36. In embodiments of the agitating system having more than one agitator, multiple drives may be coupled to respective agitators (e.g., the shafts) to enable movement of each agitator to be independently controllable. In certain embodiments, other types of agitators may be used in the agitating system. For example, an agitator may move linearly in the sub-hopper (e.g., along the longitudinal axis 58) to move the particulate material.

The drive system 72 of the agitating system 37 may be configured to drive the agitator 63 to rotate, such as via a motor (e.g., an electric motor, hydraulic motor, etc.). In the illustrated embodiment, the drive system 72 includes a single motor disposed at an end of the sub-hopper 64. However, additional or alternative embodiments of the drive system may include more than one motor (e.g., 2, 3, 4, 5, etc.). For example, the drive system may include a motor disposed at each longitudinal end of the sub-hopper (e.g., along the longitudinal axis 58). The drive system may also include motor(s) disposed along the length of the sub-hopper. Motor(s) disposed along the length of the sub-hopper may be connected to the agitator and may be configured to drive the agitator. As the agitator 63 turns, the agitator agitates the particulate material moves within the sub-hopper 64.

In the illustrated embodiment, the agitating system 37 includes a single agitator 63. In certain embodiments, multiple agitators (e.g., 2, 3, 4, 5, 6, 7, 8, etc.) may be disposed in the sub-hopper and/or the secondary storage tank. The agitators may be disposed in series or in parallel. In a configuration with more than one agitator, drive system(s) may drive only a portion of the agitators or all of the agitators to agitate the particulate material. Multiple agitators may also be disposed at different levels in the sub-hopper and/or secondary storage tank. For example, one or more agitator(s) may be disposed in the sub-hopper and one or more agitator(s) may be disposed higher in the secondary storage tank.

In some embodiments, the agricultural system 8 includes a controller 80 that is communicatively coupled to the agitating system 37. The controller 80 may control operation of the agitating system 37, such as rotation of the agitator 63 by controlling the drive system 72. The controller 80 includes a processor 82 configured to execute software code or instructions stored on a memory 84. Moreover, the controller 80 is communicatively coupled to the sensors 60 and the drive system 72 to enable operation of the drive system 72 based on feedback from the sensors 60. The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

As an example, the memory 84 may store processor-executable software code or instructions (e.g., firmware or software), which are tangibly stored on a tangible computer readable medium. Additionally or alternatively, the memory 84 may store data (e.g., information regarding operation of the agitating system 37). As an example, the memory 84 may include a volatile memory, such as random access memory (RAM), and/or a nonvolatile memory, such as read-only memory (ROM), flash memory, a hard drive, or any other suitable optical, magnetic, or solid-state storage medium, or a combination thereof. Furthermore, the processor 82 may include multiple microprocessors, one or more "general-purpose" microprocessors, one or more special-purpose microprocessors, and/or one or more application specific integrated circuits (ASICS), or some combination thereof. For example, the processor 82 may include one or more reduced instruction set (RISC) or complex instruction set (CISC) processors. The processor 82 and/or memory 84, and/or an additional processor and/or memory, may be located in any suitable portion of the agricultural system. For instance, a memory may be located in the drive system 72.

The agitating system 37 includes a deflector 100 positioned to reduce the force exerted by the particulate material (e.g., along the vertical axis 56 due to gravity) onto the agitator 63. For example, the deflector 100 may be positioned near or extend within the sub-hopper 64, such as above a top of the agitator 63 along the vertical axis 56. As such, the deflector 100 directs particulate material flow around the agitator 63, thereby reducing the force imparted onto the agitator 63, and enabling the agitator 63 to be rotated more easily and with less power. As a result, the performance of the agitating system 37 may be enhanced due to the reduced loading on the agitator 63. Furthermore, as illustrated, the deflector 100 extends along a length 104 of the agitator 63 (e.g., the shaft 70) along the longitudinal axis 58. For example, the deflector 100 may extend along the entire length 104 of the agitator 63, 90% of the length 104, 75% of the length 104, and so forth. Thus, the deflector 100 may direct particulate material around multiple sections or areas of the agitator 63. In certain implementations, the deflector 100 may be formed from metal (e.g., steel), a composite, or any combination thereof, to support the vertical load of the particulate material without substantially deflecting.

In the illustrated embodiment, the deflector 100 is coupled to the secondary storage tank 36 via one or more brackets 106. By way of example, the brackets 106 may be attached to the secondary storage tank 36 (e.g., welded), such as to a wall 108 of the secondary storage tank 36, and extend along the lateral axis 57. The deflector 100 may be coupled to the brackets 106, such as via welds, fasteners, tabs, another suitable component, or any combination thereof. In certain embodiments, the deflector may be removably coupled to the brackets. For example, the brackets may include tabs configured to engage the deflector to hold the deflector in the desired position. Moreover, although the agitating system 37 has three brackets 106, the agitating system may have any suitable number of brackets to hold the deflector. For example, the agitating system may have one bracket, five or more brackets, or no brackets, in which the deflector may be directly coupled to the secondary storage tank (e.g., at the ends of the deflector).

Figure 3:
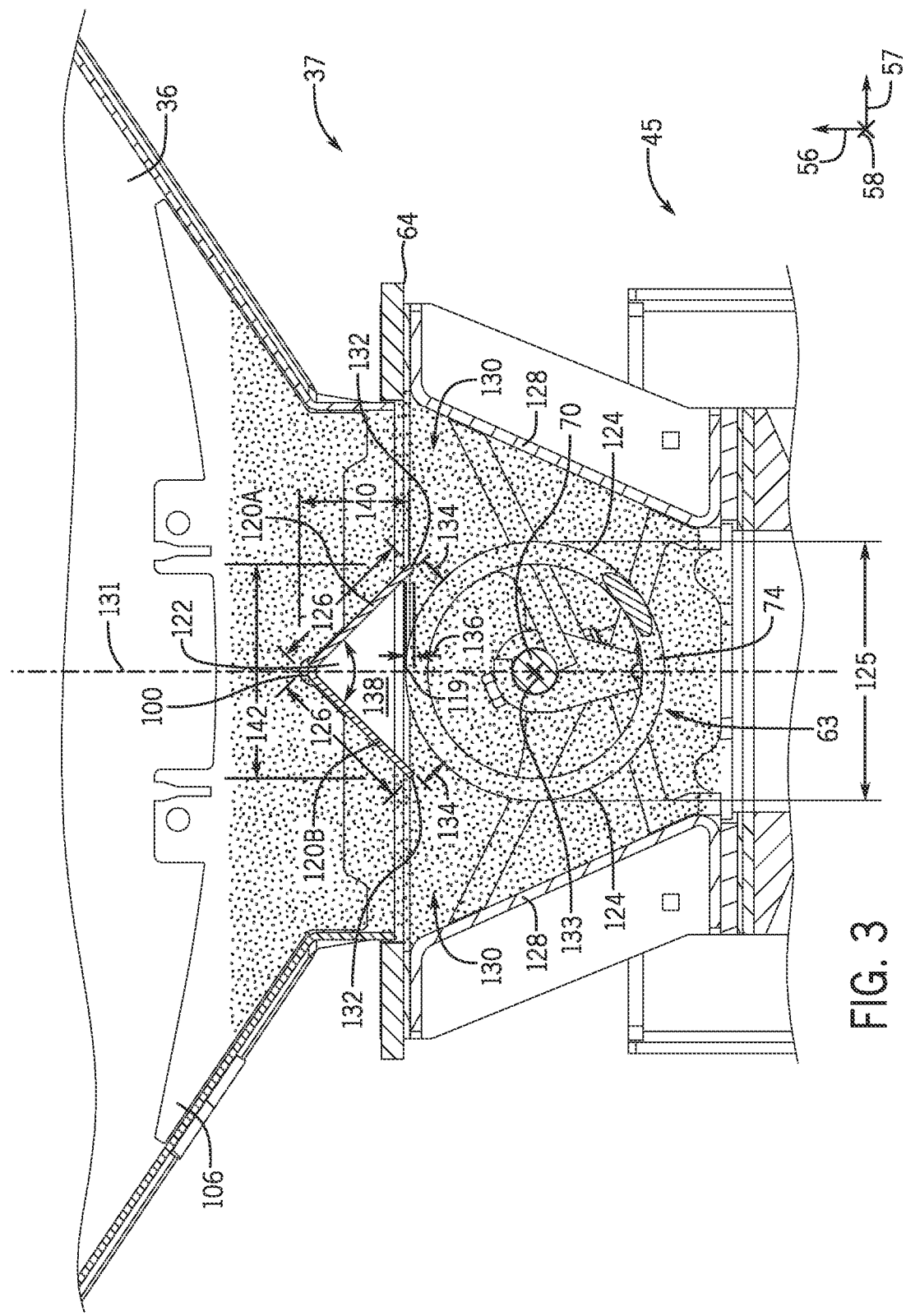
FIG. 3 is a cross-sectional side view of the agitating system of FIG. 2 having the deflector, in which particulate material may be flowing from a storage tank through a sub-hopper, in accordance with an aspect of the present disclosure.

FIG. 3 is a cross-sectional side view of the agitating system 37 of FIG. 2 having the deflector 100, in which particulate material 118 may be flowing from the storage tank 36 through the sub-hopper 64. The deflector 100 may be positioned adjacent to the agitator 63, such as adjacent to or at the interface between the secondary storage tank 36 and the sub-hopper 64. The configuration of the deflector 100, such as the geometry and the position of the deflector 100, may be selected to control the force applied by the particulate material 118 onto the agitator 63, such as on the top 119 of the agitator coil 74 and the shaft 70, while also enabling the agitator 63 to promote movement of the particulate material 118. In the illustrated embodiment, the deflector 100 includes a first leg 120A and a second leg 120B, which is oriented at an angle 122 to the first leg 120A. Although the illustrated deflector 100 has legs 120 that are substantially straight, the deflector may additionally or alternatively have legs that are not straight (e.g., curved, angled, etc.). Each leg 120 extends a leg length 126 toward the sub-hopper 64 between respective lateral sides 124 of the agitator coil 74 and a respective wall 128 of the sub-hopper 64. Thus, the deflector 100 may have an A-shape or triangular configuration, in which the legs 120 are positioned above the respective lateral sides 124 of the agitator coil 74 and within an agitator width 125 of the agitator 63. Although a particular configuration of the deflector 100 is shown in FIG. 3, in which the respective leg lengths 126 of the legs 120 are approximately equal to one another, the deflector may have an alternative configuration. For example, the deflector may have a gambrel or a "lean-to" geometric shape, the deflector may have a different number of legs, and/or the leg lengths of the legs may differ from one another. In general, the deflector may be shaped in any suitable geometry to reduce the force exerted on the agitator 63 by the particulate material 118. For example, the deflector may have legs that are each angled with respect to the lateral axis 57 to induce particulate material 118 to move along the deflector (e.g., via gravity).

In the A-shape or triangular configuration of the deflector 100, the leg length 126 and the angle 122 between the first leg 120A and the second leg 120B may be set to enable the legs 120 to block particulate material 118 from flowing directly onto a portion of the agitator 63, without inhibiting the flow of the particulate material 118 between the legs 120 and the wall 128. For instance, the angle may be between 45 degrees and 90 degrees, 60 degrees and 120 degrees, 90 degrees and 145 degrees, or any other suitable angle, and the leg length 126 may be between 50 millimeters (mm) to 70 mm, 30 mm to 60 mm, over 70 mm, or any other suitable length. In alternative embodiments, the leg length of the first leg may be different than the leg length of the second leg. In further embodiments, the angle may differ along the length of the agitator. In other words, a first angle at a first section of the deflector along the length of the agitator may be different than a second angle at a second section of the deflector along the length of the agitator. Additionally, the slope of each leg 120 may direct particulate material 118 along the lateral axis 57. As an example, the legs 120 may direct particulate material 118 through a gap 130 extending between each leg 120 and the respective wall 128. Thus, as particulate material 118 flows from the secondary storage tank 36 through the sub-hopper 64, the deflector 100 may reduce the force exerted on the agitator 63 by the particulate material 118. Instead, the legs 120 of deflector 100 guide the particulate material 118 to flow through the gaps 130, and the lateral sides 124 of the agitator coil 74 may receive the particulate material 118, thereby promoting movement of the particulate material 118.

The deflector 100 may be approximately aligned with the agitator 63 along the lateral axis 57. As illustrated, the deflector 100 is centered about a vertical axis 131 extending through a rotational axis 133 of the shaft 70. Thus, in the depicted embodiment, the deflector 100 may be symmetrical about the vertical axis 131 and the rotational axis 133 to evenly distribute particulate material 118 toward the lateral sides 124. Additionally, the deflector 100 may be positioned such that the deflector 100 effectively shields the agitator 63 from particulate material 118 moving through the sub-hopper 64 along the vertical axis 56. Furthermore, a distal edge 132 of each leg 120 of the deflector 100 is positioned a first distance 134 away from the agitator coil 74. For example, the first distance 134 may be 5 mm to 20 mm, 20 mm to 30 mm, greater than 30 mm, or another suitable distance, thereby substantially reducing or eliminating the possibility of particulate material 118 becoming stuck between the agitator coil 74 and the respective legs. To this end, the distal edge 132 of each leg 120 may be placed a second distance 136 of approximately 5 mm to 10 mm, greater than 10 mm, or another suitable distance below the top 119 of the agitator coil 74 along the vertical axis 56, such that the top 119 of the agitator coil 74 extends past the distal edges 132 and between the legs 120. In the illustrated embodiment, the position of the deflector 100 may form a space 138 between the deflector 100 and the agitator 63. In some instances, rotation of the agitator 63 may cause some particulate material 118 to enter the space 138. The first distance 134 may enable the agitator 63 to generally move particulate material 118 in and out of the space 138.

In certain embodiments, the angle 122 between the legs 120 and the respective leg lengths 126 of each leg may be selected to establish a desired area of the space 138, such as based on a deflector height 140 and/or a deflector width 142. For instance, the deflector height 140 may be established to enable the particulate material 118 to move in and out of the space 138. In another example, the deflector width 142 may be established such that the deflector width 142 of the deflector 100 does not extend beyond the agitator width 125 of the agitator 63. That is, the deflector 100 does not completely block the agitator coil 74 from particulate material 118 flowing into the agitating system 37 along the vertical axis 56. As such, the lateral sides 124 of the agitator coil 74 remain exposed to the particulate material 118 relative to the vertical axis 56 to enable the agitator coil 74 to be in contact with the particulate material 118 and promote movement of the particulate material 118. For example, the deflector width 142 may be less than (e.g., 95 percent, 90 percent, or less than 90 percent) the agitator width 125. In additional or alternative embodiments, the deflector 100 may include multiple deflector heights 140 and/or deflector widths 142. For example, the deflector 100 may have legs 120 of different leg lengths 126, and thus, the deflector height 140 and/or the deflector width 142 on one side of the deflector 100 relative to the vertical axis 131 is different than the respective deflector height 140 and/or the deflector width 142 on the other side of the deflector 100 relative to the vertical axis 131.

Figure 4:
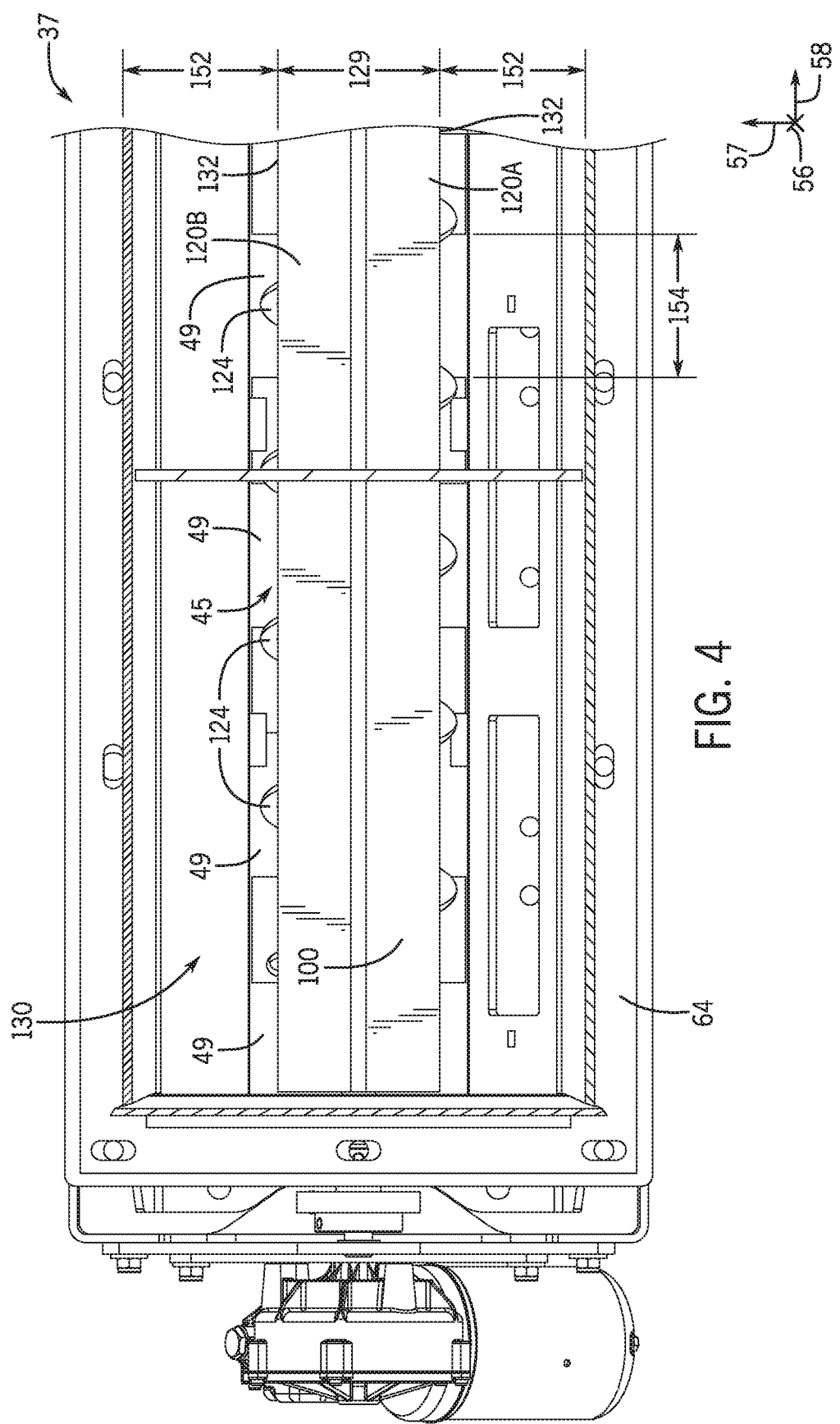
FIG. 4 is a cross-sectional top view of the agitating system of FIGS. 3 and 4 having the deflector, in accordance with an aspect of the present disclosure.

FIG. 4 is a cross-sectional top view of the agitating system 37 of FIGS. 2 and 3 having the deflector 100. As illustrated, the deflector 100 is positioned such that the lateral sides 124 of the agitator coil 74 are exposed and protrude outwardly from the deflector 100 along the lateral axis 57. Thus, the agitator coil 74 may be in contact with particulate material flowing through the sub-hopper 64 along the vertical axis 56 to promote movement of the particulate material effectively through the inlets 49 of the metering system 45. However, the deflector 100 may cover a substantial portion of the agitator coil 74, such as 50 percent, 75 percent, 90 percent, or greater than 90 percent of a surface area of the agitator coil 74. The deflector 100 has the deflector width 142, which may be measured between the respective distal edges 132 of each leg 120 along the lateral axis 57, and may be selected such that a gap width 152 of each gap 130 is less than an inlet width 154 of the inlets 49 along the lateral axis 57. For example, the deflector width 142 may be between 70 mm and 100 mm (e.g., 89 mm), 100 mm to 150 mm, less than 70 mm, or another suitable width such that the respective gap widths 152 are each greater than the inlet widths 154. For example, the inlet widths 154 (e.g., 60 mm) may be approximately 80 percent-95 percent, less than 80 percent, or another suitable percentage of the respective gap widths 152 (e.g., 66 mm). In this manner, the gap 130 may not limit the particulate material from flowing through the inlets 49 to the metering system 45 and, accordingly, the deflector 100 does not substantially reduce the flow of particulate material to the metering system 45.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agitating system, comprising:
a sub-hopper configured to receive particulate material;
an agitator disposed within the sub-hopper, wherein the agitator is configured to promote movement of the particulate material through the sub-hopper to multiple inlets of meters, each meter comprising a meter roller configured to control flow of the particulate material to at least one row unit, and the agitator is configured to distribute the particulate material across the multiple inlets; and
a deflector configured to block a portion of the particulate material from exerting a force onto the agitator as the particulate material flows through the sub-hopper, wherein the deflector is positioned such that the agitator extends beyond a first distal edge and a second distal edge of the deflector along a lateral axis.

2. The agitating system of claim 1, wherein the deflector has a first leg and a second leg disposed at an angle with respect to one another to form a triangular shape.

3. The agitating system of claim 2, wherein a first length of the first leg is approximately equal to a second length of the second leg.

4. The agitating system of claim 2, wherein the first leg and the second leg extend along respective axes that skew relative to a rotational axis of the agitator.

5. The agitating system of claim 1, wherein the deflector is positioned above the agitator, and a top of the agitator extends beyond the first distal edge and the second distal edge of the deflector along a vertical axis.

6. The agitating system of claim 1, wherein the agitator comprises a shaft extending along a longitudinal axis, and the deflector is substantially aligned with the shaft along the lateral axis.

7. The agitating system of claim 6, wherein the deflector extends along a substantial portion of a length of the shaft along the longitudinal axis.

8. The agitating system of claim 1, wherein an apex of the deflector extends along an axis that is parallel to a rotational axis of the agitator.

9. An agitating system of an agricultural system, comprising:
an agitator, comprising:
a shaft extending along a length of the agitator; and
an agitator coil coupled to the shaft, wherein the agitator coil is wrapped around the shaft along the length of the agitator, and the agitator, in response to rotation of the agitator coil with the shaft, is configured to promote movement of particulate material and to distribute the particulate material across multiple inlets of meters, each meter comprising a meter roller configured to control flow of the particulate material to at least one row unit; and
a deflector positioned adjacent to the agitator, wherein the deflector extends along the length of the agitator and is configured to block a portion of the particulate material from flowing directly onto the agitator.

10. The agitating system of claim 9, wherein the deflector comprises a first leg and a second leg disposed at an angle with respect to one another to form a triangular configuration.

11. The agitating system of claim 10, wherein a first distal edge of the first leg and a second distal edge of the second leg is disposed between 5 millimeters (mm) and 10 mm below a top of the agitator coil along a vertical axis.

12. The agitating system of claim 11, wherein the first distal edge of the first leg and the second distal edge of the second leg are separated from one another by a distance along a lateral axis, wherein the distance is between 70 mm and 100 mm.

13. The agitating system of claim 10, wherein the angle between the first leg and the second leg is between 60 degrees and 120 degrees.

14. The agitating system of claim 9, wherein a deflector width of the deflector does not extend beyond an agitator width of the agitator along a lateral axis.

15. The agitating system of claim 9, wherein the deflector is substantially symmetrical about a rotational axis of the shaft.

16. An agricultural system, comprising:
a storage tank configured to hold particulate material;
a plurality of meters coupled to the storage tank, wherein each meter of the plurality of meters comprises a metering device configured to rotate to control flow of the particulate material to at least one row unit of a plurality of row units;
an agitator configured to promote movement of the particulate material through the storage tank and distribute the particulate material across respective inlets of the plurality of meters; and
a deflector configured to block a portion of the particulate material from flowing directly onto the agitator, wherein the deflector comprises a first leg and a second leg disposed at an angle with respect to one another to form a triangular shape, and the deflector is positioned adjacent to the agitator such that a top of the agitator extends past a first distal edge of the first leg and past a second distal edge of the second leg between the first leg and the second leg along a vertical axis.

17. The agricultural system of claim 16, comprising a bracket coupled to a wall of the storage tank and to the deflector, wherein the bracket is configured to support the deflector.

18. The agricultural system of claim 16, wherein each inlet of the respective inlets of the plurality of meters has a respective first width, the deflector is positioned such that a gap is formed between the deflector and a wall of the storage tank, and the gap has a second width that is greater than each of the respective first widths.

19. The agricultural system of claim 16, wherein the agitator is positioned below the deflector with respect to a vertical axis.

20. The agricultural system of claim 16, comprising the plurality of row units configured to receive the particulate material from the plurality of meters, wherein each row unit of the plurality of row units is configured to deposit the particulate material.

* * * * *